United States Patent
Zhdanov et al.

(10) Patent No.: US 10,874,903 B2
(45) Date of Patent: Dec. 29, 2020

(54) METHODS AND SYSTEMS FOR LOCATING A GOLF BALL

(71) Applicant: TechnoImaging, LLC, Salt Lake City, UT (US)

(72) Inventors: Michael S. Zhdanov, Salt Lake City, UT (US); Leif H. Cox, Francis, UT (US); Vladimir Burtman, Sandy, UT (US)

(73) Assignee: TechnoImaging, LLC, Salt Lake City, UT (US)

( * ) Notice: Subject to any disclaimer, the term of this patent is extended or adjusted under 35 U.S.C. 154(b) by 0 days.

(21) Appl. No.: 16/852,040

(22) Filed: Apr. 17, 2020

(65) Prior Publication Data

US 2020/0238133 A1 Jul. 30, 2020

Related U.S. Application Data

(62) Division of application No. 16/222,406, filed on Dec. 17, 2018.

(Continued)

(51) Int. Cl.
*A63B 24/00* (2006.01)
*H04N 5/33* (2006.01)
(Continued)

(52) U.S. Cl.
CPC .......... *A63B 24/0021* (2013.01); *G06T 5/003* (2013.01); *H04N 5/33* (2013.01);
(Continued)

(58) Field of Classification Search
CPC .......... A63B 24/0021; A63B 2220/806; G06T 5/003; G06T 2207/10048; G06T 2207/30224; H04N 5/33
(Continued)

(56) References Cited

U.S. PATENT DOCUMENTS 6,524,199 B2    2/2003   Goldman
6,634,959 B2   10/2003   Kuesters
(Continued)

FOREIGN PATENT DOCUMENTS

CN    105963951    9/2016

OTHER PUBLICATIONS

U.S. Appl. No. 62/607,252, filed Dec. 18, 2017, Zhdanov, et al.
(Continued)

*Primary Examiner* — Matthew K Kwan
(74) *Attorney, Agent, or Firm* — Ray Quinney & Nebeker P.C.; Paul N. Taylor

(57) ABSTRACT

A method for locating a golf ball including changing a temperature of a golf ball from a first temperature to a second temperature before use or marking the ball by reflective (mirror) or fluorescent material (e.g., NIR-IR fluorescent dye). The temperature changed ball is struck. Using either a thermal imaging camera with an imaging processing unit or a near-infrared (NIR) imaging camera with an imaging processing unit to produce a digital image of a part of the golf course with a potential golf ball location. An image processing technique is applied to produce an enhanced image of the golf ball location. A thermal imaging camera and a NIR imaging camera for locating a golf ball are described. A non-transitory computer readable media is described.

17 Claims, 3 Drawing Sheets

Related U.S. Application Data

(60) Provisional application No. 62/607,252, filed on Dec. 18, 2017.

(51) Int. Cl.
*G06T 5/00* (2006.01)
*A63B 1/00* (2006.01)

(52) U.S. Cl.
CPC .............. *A63B 2220/806* (2013.01); *G06T 2207/10048* (2013.01); *G06T 2207/30224* (2013.01)

(58) Field of Classification Search
USPC ........................................................ 348/164
See application file for complete search history.

(56) References Cited

U.S. PATENT DOCUMENTS

| | | | | |
|---|---|---|---|---|
| 6,879,735 | B1* | 4/2005 | Portniaguine | G06T 5/20 |
| | | | | 382/261 |
| 2004/0254255 | A1* | 12/2004 | Sullivan | A63B 37/0075 |
| | | | | 521/143 |
| 2006/0046861 | A1* | 3/2006 | Lastowka | A63B 69/3658 |
| | | | | 473/151 |
| 2008/0061236 | A1* | 3/2008 | Meredith | A63B 43/00 |
| | | | | 250/338.1 |
| 2011/0009517 | A1* | 1/2011 | Tamai | C08F 2/38 |
| | | | | 522/115 |

OTHER PUBLICATIONS

Ballfinder Scout—Golf Ball Finding System Ballfinder Scout—Golf Ball Finding System; In the Hole Golf; accessed from: http://www.intheholegolf.com/Merchant2/merchant.mvc?Screen=PROD&Store_Code=ITHG&Product_Code=PFSCT&utm_source=google&utm_medium=cse&utm_term=BFSCT&gclid=Cj0KCQjwoZTNBRCWARIsAOMZHmGg0oRc3bOAMAzJ1MoUZ9fH7vs1y2qHG3HCU8bF3BymfZa90sO-HMYaAss3EALw_wcB, accessed on Dec. 13, 2018.

* cited by examiner

THE DRAWINGS

Visualization of temperatures of object by IR instrument

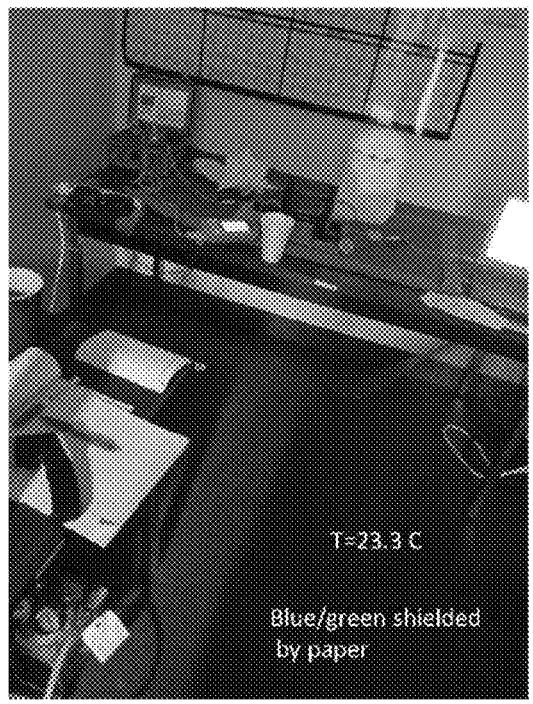

Measuring the temperature of cold golf ball located in Lab from 8 m distance shielded by A4 paper The blue color of cold golf ball can be still seen on shielded golf ball

Figure 3

Visualization of temperatures of object by IR instrument

Measuring the temperature of cold golf ball located in Lab from 20 m distance

The blue color of the spot on cold golf ball corresponds to its lower temperature (21.1 C), which is lower than room temperature (24.5 C)

Figure 4

METHODS AND SYSTEMS FOR LOCATING A GOLF BALL

CROSS-REFERENCE TO RELATED APPLICATIONS

This application is a divisional of U.S. patent application Ser. No. 16/222,406, filed Dec. 17, 2018, which claims the benefit of U.S. Provisional Patent Application No. 62/607,252, filed on Dec. 18, 2017, which are hereby incorporated by reference in their entireties.

BACKGROUND

1. The Field of the Disclosure

The implementations disclosed herein relate to the game of golf and practical needs of locating the golf ball, which is not always straightforward, especially if the ball hits the long grass. In general, the implementations disclosed herein introduce the novel methods of locating golf balls by using innovative detections principles and systems.

2. The Relevant Technology

There are several different kinds of golf ball detectors, and each uses a unique way to find the ball. One commercially available technique is based on an electromagnetic signal transmitted from the ball and recorded by the processor which determines (triangulates) the location of the ball [U.S. Pat. No. 6,634,959B2 by Eckhard H. Kuesters, U.S. Pat. No. 6,524,199B2 by Cheryl Goldman, [CN105963951A].

There are also various applications of the GPS systems, built in the ball, which allow the golfer to easily locate the ball.

The ball location systems referenced above required using the specialized balls with the preinstalled devices inside the balls. These devices (transmitters) must be installed inside the balls by cutting or drilling the ball. To make sure that the transmitter does not break when the golf ball is hit, the remaining space is filled with a filling material.

Another systen is based on photo imaging, which can only detect white balls (e.g., Ballfinder Scout—Golf Ball Finding System Ballfinder Scout—Golf Ball Finding System: www.intheholegolf.com/Merchant2/merchant.mvc?Screen=PROD&Store_Code=ITHG&Product_Code=BFSCT&utm_source=google&utm_medium=cse&utm_term= BFSCT&gclid=CjOKC QjwoZTNBRCWARIsAOMZHmGg0o-Rc3bOAMAzJ1MoUZ9fH7vs1y2qHG3HCU8bF3BymfZ-a90sO-HMYaAss3EALw_wcB).

However, the severe limitation of this system is that the ball needs to be at least 1% visible and within 11 meters of the device. In a case of ball hitting a long grass, it becomes invisible for the optical system.

BRIEF SUMMARY

At least one of the implementations disclosed herein provides a novel method of golf ball locations using an innovative physical method. There is a need for a system to locate accurately conventional golf balls, used by the golfers, which are not modified, cut, or drilled, and have no additional specialized structural features required by known ball detection technologies. Furthermore, there is a need for a system to provide golfers with the position of their golf balls hidden in the long grass or in the bushes.

Thus, one object of at least one implementation of this disclosure is to safely provide a system capable of giving individual golfers the location of their golf ball independently of the type of the ball and origin of its manufacturing.

Another object of at least one implementation of the present disclosure is to provide a system locating golf balls which automatically produces the visual representation of the location of the golf ball.

In at least one implementation of this disclosure, a novel technique is introduced to make the physical characteristic of the ball different from the surrounding environment without physical or mechanical modification of the ball. This novel technique may include changing the temperature of the ball before its use by the golfers. At least one advantage of this approach is that it does not require using a specialized ball and/or can be used with any commercially available golf balls.

In one implementation of this disclosure, the proposed system uses a thermal imaging camera with imaging processing unit which is computer program to find the ball. To make the ball detectable by the thermal imaging camera, the golfer would induce a thermal contrast in the golf ball relative to the surroundings (e.g., by putting it in the ice holder, like beer cooler, by applying heat with a convective and/or conductive heater). A thermal imaging camera will detect the ball even through a thin cover (leaves, grass). Standard golf balls could be used. The imaging processing unit may produce a visual display of the location of the golf ball, and/or may include the location coordinates and/or a terrain display with the location identified.

In another embodiment of this disclosure, a novel technique is introduced based on using electromagnetic radiation to image a golf ball with the frequency low enough to penetrate organic matter such as leaves, but high enough to retain resolution on the size of the golf ball. Depending on the frequency chosen, in one implementation of this embodiment, there may be enough ambient radiation to illuminate the golf ball, which would enable a passive sensor and relatively simple instrument design. In another implementation of this embodiment, it may be necessary to create an active source to provide enough energy to illuminate the golf ball in the desired frequency range.

In yet another embodiment of this invention, to make the physical characteristic of the ball different from the surrounding environment and other balls and to increase the detectability of the golf ball, a reflective or fluorescent material will be added to the ball's surface. This could include a material with a unique spectral signature to aid in identification of the ball, for example, the near-infrared reflectance (NIR)—infrared reflectance (IR) spectroscopy can be used to detect the golf balls covered marked by reflective (mirror) or fluorescent material (e.g., NIR-IR fluorescent dye). IR light should penetrate to a certain extend through grass and soil.

These and other objects and features of the present disclosure will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific implementations thereof which are illustrated in the appended drawings. It is appreciated that these drawings depict only illustrated implementations of the invention and are therefore not to be considered limiting of its scope. The invention will be described and explained with additional specificity and detail through the use of the accompanying drawings in which:

FIG. 3 illustrates an implementation of a method for golf ball detection using a thermal imaging camera with imaging processing unit. It shows a detection of a cold golf ball located in Lab from 8 m distance shielded by A4 paper. The blue color of the spot on the cold golf ball can still be seen even if it corresponds to just one-degree difference between the temperature of the ball (23.3° C.) and the room temperature (24.5° C.).

FIG. 4 illustrates an implementation of a method for golf ball detection using a thermal imaging camera with imaging processing unit. It shows a detection of cold golf ball located in lab from 20 m distance.

DETAILED DESCRIPTION

The implementations disclosed herein relate in general to location of the golf balls lost by golfer in, for example, the thick grass (e.g., rough).

In one implementation of this disclosure, the golf balls may be cooled by keeping them in a portable cooler. In another implementation of the disclosure, the golf balls may be heated by keeping them in a portable ball warmer. When the golfer is ready to use the ball, he or she takes the ball from the cooler/heater and hits it. The precooled/preheated ball has a temperature well below/above the temperature of the surrounding environment, including ground and grass, thus providing a significant contrast of the temperature between the ball and the ground/grass.

Figure 1:
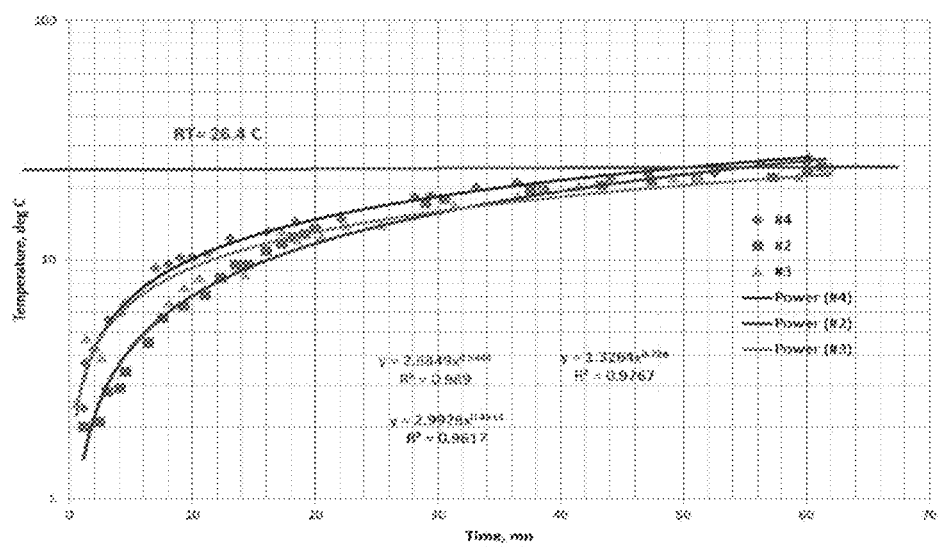
FIG. 1 illustrates an implementation of a method for golf ball detection using a thermal imaging camera. It presents a plot of an ambient heating (to room temperature) of the cooled golf balls.

It takes some time for the ball to warm up (or cool down) and to reach an equilibrium with the temperature of the environment. FIG. 1 presents a plot of an ambient heating (to room temperature) of the cooled golf balls. One can see that it takes about 30 minutes for the temperature of a standard ball to raise from a typical cooler temperature (around 12° C.) up to the room temperature (around 26° C.). Thus, during almost half an hour, there is a temperature contrast of a few degrees C., strong enough to discriminate the ball from the surrounding environment.

Figure 2:
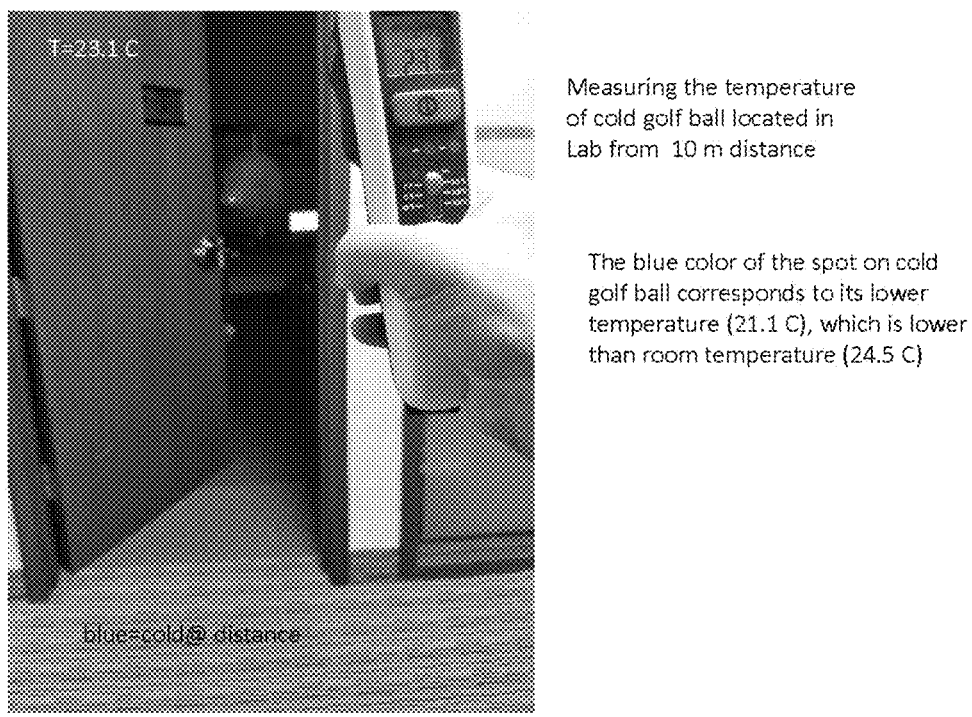
FIG. 2 illustrates an implementation of a method for golf ball detection using a thermal imaging camera with imaging processing unit. It shows a detection of a cold golf ball located in lab from 10 m distance. The blue color of the spot on cold golf ball corresponds to its relatively lower temperature (21.1° C.), which is lower than room temperature (24.5° C.).

As an example, FIG. 2 shows a detection of a cold golf ball located in lab from 10 m distance using a thermal imaging camera. The blue color of the spot on cold golf ball corresponds to its relatively lower temperature (21.1° C.), which is lower than room temperature (24.5° C.).

The golfer may have a situation where the ball is hidden in the long grass. This situation is imitated in the lab by shielding the ball with a standard A4 paper. FIG. 3 shows that a cold golf ball located in Lab from 8 m distance and shielded by A4 paper can still be easily detected even if the difference between the temperature of the ball (23.3° C.) and the room temperature (24.5° C.) is just about one-degree C.

FIG. 4 shows a detection of cold golf ball located in lab from 20 m distance.

In the implementations of this disclosure, the golfer uses a thermal imaging camera with imaging processing unit which is computer program to find the ball. The digital image generated by the camera may be processed using a specialized image processing technique, which may be optimized to enhance the ball location.

In another embodiment of this disclosure, electromagnetic radiation is used to image a golf ball. The frequency must be low enough to penetrate organic matter such as leaves, but high enough to retain resolution on the size of the golf ball. The optimal solution will likely fall in the 30 GHz to 30 THz range.

Depending on the frequency chosen, there may be enough ambient radiation to illuminate the golf ball. This would enable a passive sensor and simplify the instrument design. However, it may be necessary to create an active source to provide enough energy to illuminate the golf ball in the desired frequency range.

Figure 5:
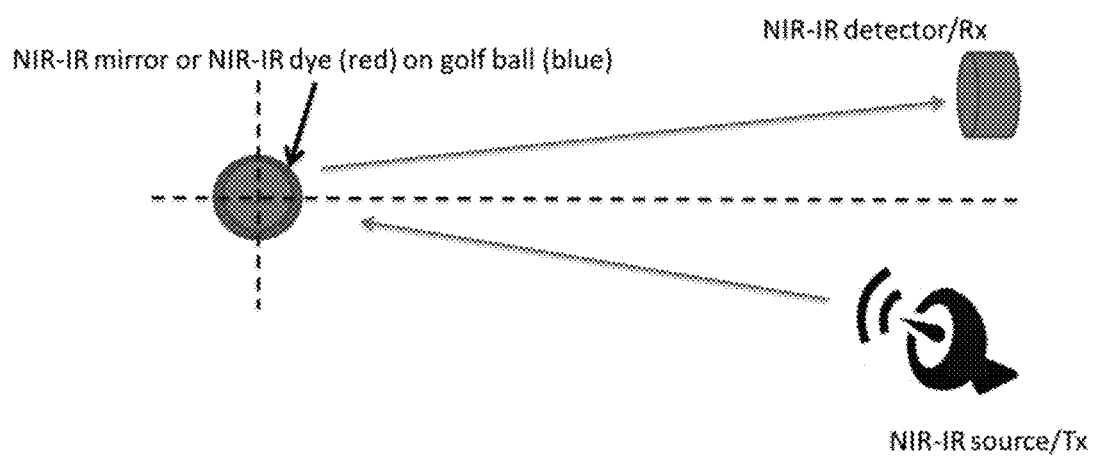
FIG. 5 illustrates the detection of the golf ball marked by a reflective (mirror) or fluorescent material and illuminated by the NIR-IR source.

To increase the detectability of the golf ball, a reflective or fluorescent material will be added. This could include a material with a unique spectral signature to aid in identification of the ball. In one implementation, NIR-IR spectroscopy may be used to detect the golf balls covered either by NIR-IR dye or NIR-IR mirror. IR light should penetrate to a certain extend through grass and soil. The general scheme of the NIR-IR golf ball location system is proposed in FIG. 5.

In one implementation of this disclosure, the proposed system uses a thermal imaging camera with imaging processing unit which is computer program to find the ball.

In another implementation of this disclosure, the proposed system uses a NIR imaging camera imaging camera with imaging processing unit which is computer program to find the ball.

In yet another implementation of the disclosure, the digital image processing technique is based on image focusing using special transformation of the observed data which produces the enhanced image of the golf ball location.

EXAMPLE 1

The following is an example of at least some of the principles of the golf ball imaging reconstruction that is offered to assist in the practice of the disclosure. It is not intended thereby to limit the scope of the disclosure to any particular theory of operation or to any field of application.

Supposing the image of the part of the golf course with the potential ball location has been obtained by the thermal vision (or NIR vision) camera, and it is denoted by $M_0$.

Our goal for image enhancement is to find an image $M_1$ close enough to $M_0$ with small variation within target area and producing the focused image of the ball. This image processing problem can be represented mathematically as the minimization of the following functional:

$$P(M_1) = \|M_1 - M_0\|_{L_2}^2 + \alpha S(M_1) \tag{1}$$

where the first term is the Euclidean distance between the original image $M_0$ and the enhanced image $M_1$; and the second term imposes additional constraints such as focusing stabilizer (Zhdanov, 2015).

For example, the focusing of the image of the golf ball can be achieved by using the minimum gradient support (MGS) stabilizer:

$$S(M_1) = \int \frac{[\nabla M_1(x,y)]^2}{[\nabla M_1(x,y)]^2 + e^2} ds \qquad (2)$$

The above functional can minimize the total area with nonzero gradients and helps generate a sharp and focused image of the ball. The small number e controls the sharpness of the image.

The MGS functional can also be expressed as pseudo-quadratic functional as follows:

$$\int \frac{[\nabla M_1(x,y)]^2}{[\nabla M_1(x,y)]^2 + e^2} ds = \int [w_e(x,y) M_1(x,y)]^2 ds = \|W_e M_1\|_{L_2}^2 \qquad (3)$$

$$\text{where } w_e(x,y) = \frac{\nabla M_1(x,y)}{\sqrt{[\nabla M_1(x,y)]^2 + e^2}\sqrt{[M_1(x,y)]^2 + e^2}} \qquad (4)$$

Note that, the MGS stabilizer functional in a general case is a nonlinear functional of $M_1$, and it is not quadratic. By representing it in a pseudo quadratic form one can use the optimization technique developed for quadratic functional '

In summary, the image enhancement technique is formulated within the general framework of the inverse problem solution, where the observed data are the original thermal image $M_0$, and model parameters to be determined represent the enhanced image $M_1$. By applying the Tikhonov regularization approach, one can solve the image enhancement problem (Zhdanov, 2015).

In yet another implementation of the present disclosure, the digital image processing technique may be based on using special multinary transformation of the observed data which produce the enhanced image of the golf ball location.

EXAMPLE 2

The following is an example of at least some of the principles of the golf ball imaging reconstruction that is offered to assist in the practice of the disclosure. It is not intended thereby to limit the scope of the disclosure to any particular theory of operation or to any field of application. For example, the focusing of the image of the golf ball can be achieved by using the multinary transformation approach. In a general case, the brightness distribution of the recovered image is described by a continuous function. In ball detection problem, the desired image brightness is described by the binary function as follows:

$$\overline{m}_i = \{m_i^{(1)} = 0, m_i^{(2)} = 1\} \qquad (5)$$

or by the ternary function:

$$\overline{m}_i = \{m_i^{(1)} = -1, m_i^{(2)} = 0, m_i^{(3)} = 1\} \qquad (6)$$

Further, we can extend the description of the brightness distribution using the multinary function of order P, having discrete numbers of values:

$$\overline{m}_i = \{m_i^{(1)}, m_i^{(2)} = 0, \ldots, m_i^{(P)}\} \qquad (7)$$

In above distribution, the constant value 0 is assigned to the brightness of the image representing the ball, while all other values are assigned to the image of the surrounding environment.

In yet another implementation of this disclosure, the nonlinear transformation of the multinary function into the continuous function, can be described as follows. We transform our brightness distribution, $\rho_i$, into a model space defined by a continuous range of multinary brightness, $\tilde{\rho}_i$, using a superposition of error function:

$$\tilde{\rho}_i = E(\rho_i) = c\rho_i + \frac{1}{2}\sum_{j=1}^{P}\left[1 + \text{erf}\left(\frac{\rho_i - \rho^{(j)}}{\sqrt{2}\,\sigma_j}\right)\right] \qquad (8)$$

where $\rho = \{\rho_i\}, i=1,\ldots,N_m$, is the original vector of the model parameters; $\tilde{\rho} = \{\tilde{\rho}_i\}, i=1,\ldots,N_m$, is a new vector of the nonlinear parameters; and P is a total number of discrete (multinary) values of the model parameter (brightness), $\rho^{(j)}$. The function $E(\rho_i)$ is the error function; parameter $\sigma_j$ is a standard deviation of the value $\rho^{(j)}$; and the constant c is a small number to avoid singularities in the calculation of the derivatives of the multinary brightness.

Thus, using the above transformation (8), we can process the original thermal image $M_0$, into the multinary image $M_1$, with the properties that the brightness distribution is characterized by a finite number of discrete values of the brightness with the preassigned value of 0 for the ball location. As a result, we produce a bright and focused image of the ball location.

The present disclosure may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for locating a golf ball, the method comprising:
    marking the ball by reflective (mirror) or fluorescent material (e.g., NIR-IR fluorescent dye);
    using a near-infrared (NIR) imaging camera with an imaging processing unit to produce a digital image of a part of the golf course with a potential golf ball location;
    applying an image processing technique to produce an enhanced image of the golf ball location, wherein the image processing technique is based on image focusing using special transformation of the observed data involving focusing minimum gradient support (MGS) stabilizer, which minimizes total area with nonzero gradients of thebrightness and thus generates a sharp and focused image of the ball, and by using the multinary transformation approach, wherein the brightness is described by a brightness distribution using a superposition of error function:

$$\tilde{\rho}_i = E(\rho_i) = c\rho_i + \frac{1}{2}\sum_{j=1}^{P}\left[1 + \text{erf}\left(\frac{\rho_i - \rho^{(j)}}{\sqrt{2}\,\sigma_j}\right)\right]$$

where $\rho = \{\rho_i\}, i=1,\ldots,N_m$, is an original vector of model parameters, $\tilde{\rho} = \{\tilde{\rho}_i\}, i=1,\ldots,N_m$, is a new vector of the nonlinear parameters, and P is a total number of discrete (multinary) values of the brightness, $\rho^{(j)}$, function $E(\rho_j)$ is an error function, parameter $\sigma_j$ is a standard deviation of the value $\rho^j$, and constant c is a small number to avoid singularities in calculation of derivatives of multinary brightness.

2. A method according to claim 1, wherein an active NIR-IR source (transmitter) is used to illuminate the area of the search for a golf ball.

3. A method according to claim 1, wherein a difference between the first temperature and the second temperature is more than one degree Celsius.

4. A method according to claim 1, wherein the image processing minimizes the total area with nonzero gradients of the brightness using the following equation:

$$S(M_1) = \int \frac{[\nabla M_1(x, y)]^2}{[\nabla M_1(x, y)]^2 + e^2} ds$$

where $M_1$ is an enhanced image and e controls the sharpness of the image.

5. A method according to claim 1, wherein the image processing technique is based on the multinary transformation approach, which processes the original image into the multinary image with the properties that the brightness distribution is characterized by a finite number of discrete values of the brightness with the preassigned value of 0 for the ball location.

6. A method according to claim 5, wherein the image processing technique produces a bright and focused image of the ball location.

7. A non-transitory computer readable medium having instructions thereon that are executable to apply the image processing technique of claim 1 to produce an enhanced image of the golf ball location.

8. A NIR imaging camera for locating a golf ball, the NIR imaging camera comprising:
   a processor;
   an image processing unit; and
   memory having instructions executable to:
   produce a digital image of a part of a golf course with a potential golf ball location; and
   apply the image processing technique of claim 1 to produce an enhanced image of the golf ball location.

9. A method for locating a marked golf ball, the method comprising:
   using a near-infrared (NIR) imaging camera with an imaging processing unit to produce a digital image of a part of a golf course with a potential golf ball location;
   applying an image processing technique to produce an enhanced image of a marked golf ball location, wherein the image processing technique is based on image focusing using special transformation of the observed data involving focusing minimum gradient support (MGS) stabilizer, which minimizes total area with nonzero gradients of brightness and thus generates a sharp and focused image of the ball, and by using the multinary transformation approach, wherein the brightness is described by a brightness distribution, $\tilde{\rho}_i$, using a superposition of error function:

$$\tilde{\rho}_i = E(\rho_i) = c\rho_i + \frac{1}{2} \sum_{j=1}^{P} \left[ 1 + \mathrm{erf}\left( \frac{\rho_i - \rho^{(j)}}{\sqrt{2}\,\sigma_j} \right) \right]$$

where $\rho = \{\rho_i\}$, $i=1, \ldots, N_m$, is an original vector of model parameters, $\tilde{\rho} = \{\tilde{\rho}_i\}$, $i=1, \ldots, N_m$, is a new vector of the nonlinear parameters, and P is a total number of discrete (multinary) values of the brightness, $\rho^{(j)}$, function $E(\rho_j)$ is an error function, parameter $\sigma_j$ is a standard deviation of the value $\rho^{(j)}$, and constant c is a small number to avoid singularities in calculation of derivatives of multinary brightness.

10. A method according to claim 9, wherein the marked golf ball is marked by a reflective material.

11. A method according to claim 10, wherein the reflective material is a mirror material.

12. A method according to claim 9, wherein the marked golf ball is marked by a fluorescent material.

13. A method according to claim 12, wherein the reflective material is a NIR-IR fluorescent dye.

14. A method according to claim 9, wherein an active NIR-IR source (transmitter) is used to illuminate the area of the search for a golf ball.

15. A method according to claim 9, wherein the image processing minimizes the total area with nonzero gradients of the brightness using the following equation:

$$S(M_1) = \int \frac{[\nabla M_1(x, y)]^2}{[\nabla M_1(x, y)]^2 + e^2} ds$$

where $M_1$ is an enhanced image and e controls the sharpness of the image.

16. A method according to claim 9, wherein the image processing technique is based on the multinary transformation approach, which processes the original image into the multinary image with the properties that the brightness distribution is characterized by a finite number of discrete values of the brightness with the preassigned value of 0 for the ball location.

17. A method according to claim 16, wherein the image processing technique produces a bright and focused image of the ball location.

* * * * *